United States Patent
Pickens et al.

(10) Patent No.: US 8,069,464 B2
(45) Date of Patent: Nov. 29, 2011

(54) ARCHITECTURE FOR SCALING JUST-IN-TIME PLACEMENT OF ADVERTISING CONTENT

(75) Inventors: John Pickens, Newark, CA (US); John R. Mick, Jr., Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 761 days.

(21) Appl. No.: 11/829,492

(22) Filed: Jul. 27, 2007

(65) Prior Publication Data
US 2009/0031339 A1    Jan. 29, 2009

(51) Int. Cl.
*H04N 7/173* (2011.01)
(52) U.S. Cl. .............. 725/95; 725/32; 725/34; 709/230; 709/238; 705/14.43; 705/14.55
(58) Field of Classification Search .............. 725/32–36, 725/96, 97; 705/14.4, 14.41, 14.52, 14, 53, 705/14.55; 709/230–232, 234, 235, 238, 709/244
See application file for complete search history.

(56) References Cited

U.S. PATENT DOCUMENTS

| | | | |
|---|---|---|---|
| 6,357,042 B2 * | 3/2002 | Srinivasan et al. | 725/32 |
| 6,725,460 B1 * | 4/2004 | Nishiyama et al. | 725/32 |
| 2002/0056129 A1 * | 5/2002 | Blackketter et al. | 725/112 |
| 2002/0069404 A1 * | 6/2002 | Copeman et al. | 725/32 |
| 2002/0083443 A1 * | 6/2002 | Eldering et al. | 725/34 |
| 2002/0178447 A1 * | 11/2002 | Plotnick et al. | 725/36 |
| 2003/0145323 A1 * | 7/2003 | Hendricks et al. | 725/34 |
| 2005/0283796 A1 * | 12/2005 | Flickinger | 725/35 |
| 2009/0172723 A1 * | 7/2009 | Shkedi et al. | 725/32 |

* cited by examiner

*Primary Examiner* — Pankaj Kumar
*Assistant Examiner* — Timothy Newlin
(74) *Attorney, Agent, or Firm* — Merchant & Gould

(57) ABSTRACT

In one embodiment, a method comprises determining ad placement times for each of a plurality of associated streams. The method also comprises determining an ad selection request time for each of a plurality of ad selection requests based on a cumulative effect of any other ad selection requests occurring at substantially the same time as the determined ad selection time. Each of the plurality of ad selection requests corresponds to one of the plurality of ad placement times.

20 Claims, 10 Drawing Sheets

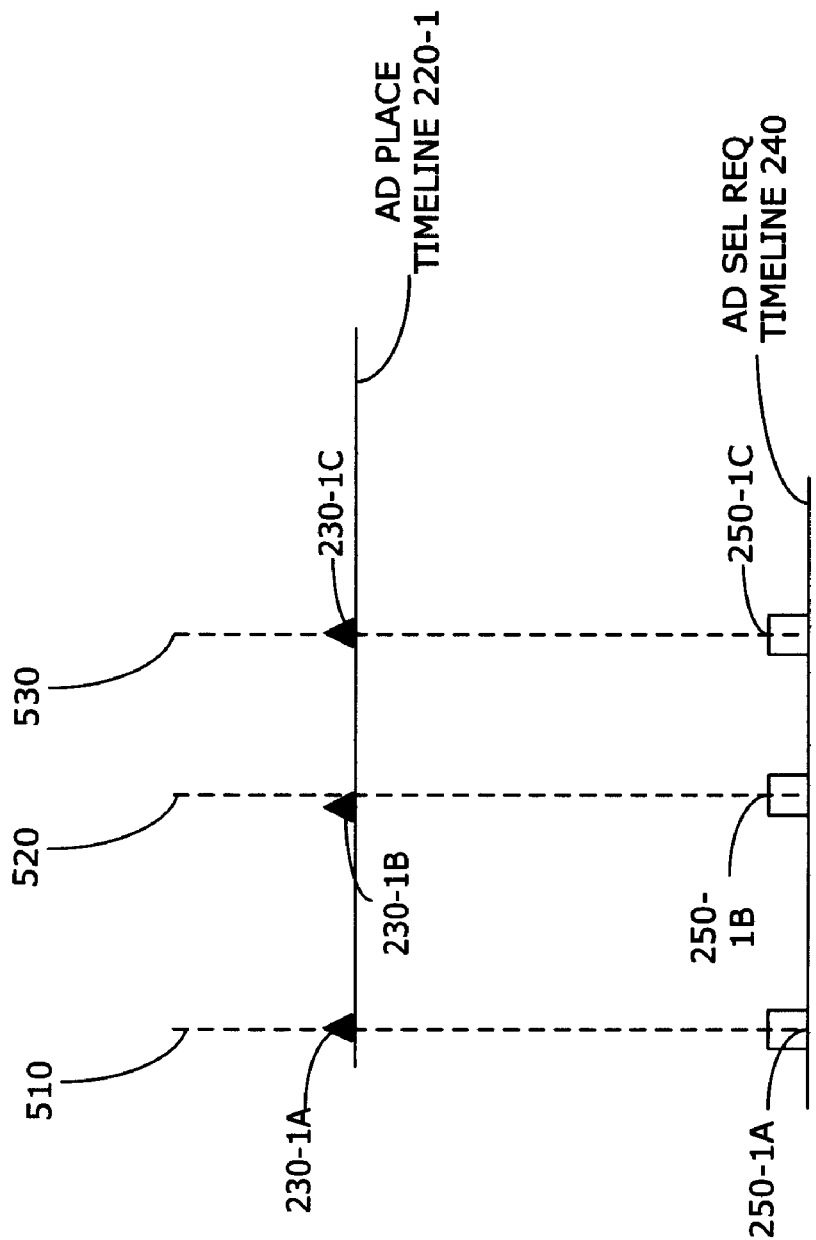

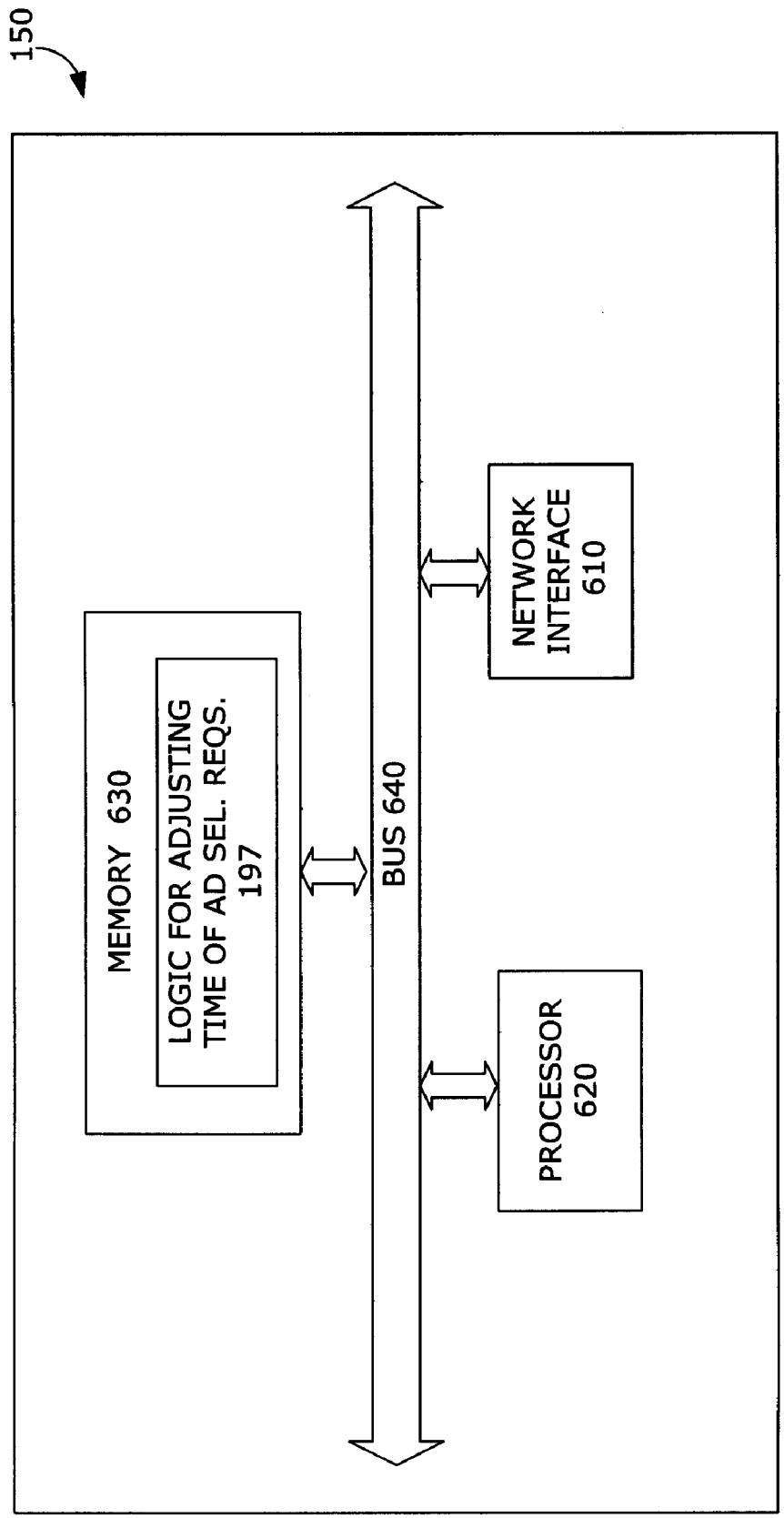

ARCHITECTURE FOR SCALING JUST-IN-TIME PLACEMENT OF ADVERTISING CONTENT

TECHNICAL FIELD

The present disclosure relates generally to placement of advertisement content in digital content streams.

BACKGROUND

Customized placement of advertising content is becoming increasingly important when delivering digital video programming. In such systems, just-in-time ad placement is preferable because it typically results in increased effectiveness of the ad. When ads are placed close to but before the time at which a user views the ad, ads can be selected based on the recent history of ad-viewing behavior for the current subscriber, as well as other subscribers. The types of history that may be examined include trick mode (skipping, reviewing), frequency at which ads are invoked by the user, and frequency at which ads are consumed by the user. Other selection criteria for just-in-time ad placement can include time of day at which the ad is viewed, and obsolescence of the advertised event (e.g., an ad for a Saturday sale viewed on Sunday morning).

Conventional ad placement systems are optimized for relatively low numbers of unique streams (on the order of hundreds), while next generation systems will be expected to scale for tens of thousands of unique streams, or even more. In conventional systems which include ad placement servers and ad selection servers, each server has an upper transaction processing limit. In many usage scenarios involving increased numbers of unique streams, bursts of ad decisions will tend to peak and overrun the processing and/or I/O resources of one or both servers. Thus, a need arises for these and other problems to be addressed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIGS. 5A-D are block diagrams illustrating creation of the predicted ad selection request timeline of FIG. 3, in one example scenario.

FIG. 6 is a block diagram showing selected components of one embodiment of the ad placement server of FIG. 1

DESCRIPTION OF EXAMPLE EMBODIMENTS

Overview

In one embodiment, a method comprises determining a plurality of ad placement times for each of a plurality of associated streams. The method also comprises determining an ad selection request time for each of a plurality of ad selection requests. The determination is based on a cumulative effect of any other ad selection requests occurring at substantially the same time as the determined ad selection request time. Each of the plurality of ad selection requests corresponds to one of the plurality of ad placement times.

In another embodiment, a system comprises memory with logic, and a processor. The processor is configured with the logic to enable the system to determine a plurality of ad placement times for each of a plurality of associated streams. The processor is further configured to enable the system to determine an ad selection request time for each of a plurality of ad selection requests. The determination is based on a cumulative effect of any other ad selection requests occurring at substantially the same time as the determined ad selection request time. Each of the plurality of ad selection requests corresponds to one of the plurality of ad placement times.

In another embodiment, a system comprises a logic configured to determining a plurality of ad placement times for each of a plurality of associated streams. The system further comprises logic configured to determining an ad selection request time for each of a plurality of ad selection requests. The determination is based on a cumulative effect of any other ad selection requests occurring at substantially the same time as the determined ad selection request time. Each of the plurality of ad selection requests corresponds to one of the plurality of ad placement times.

Example Embodiments

Figure 1:
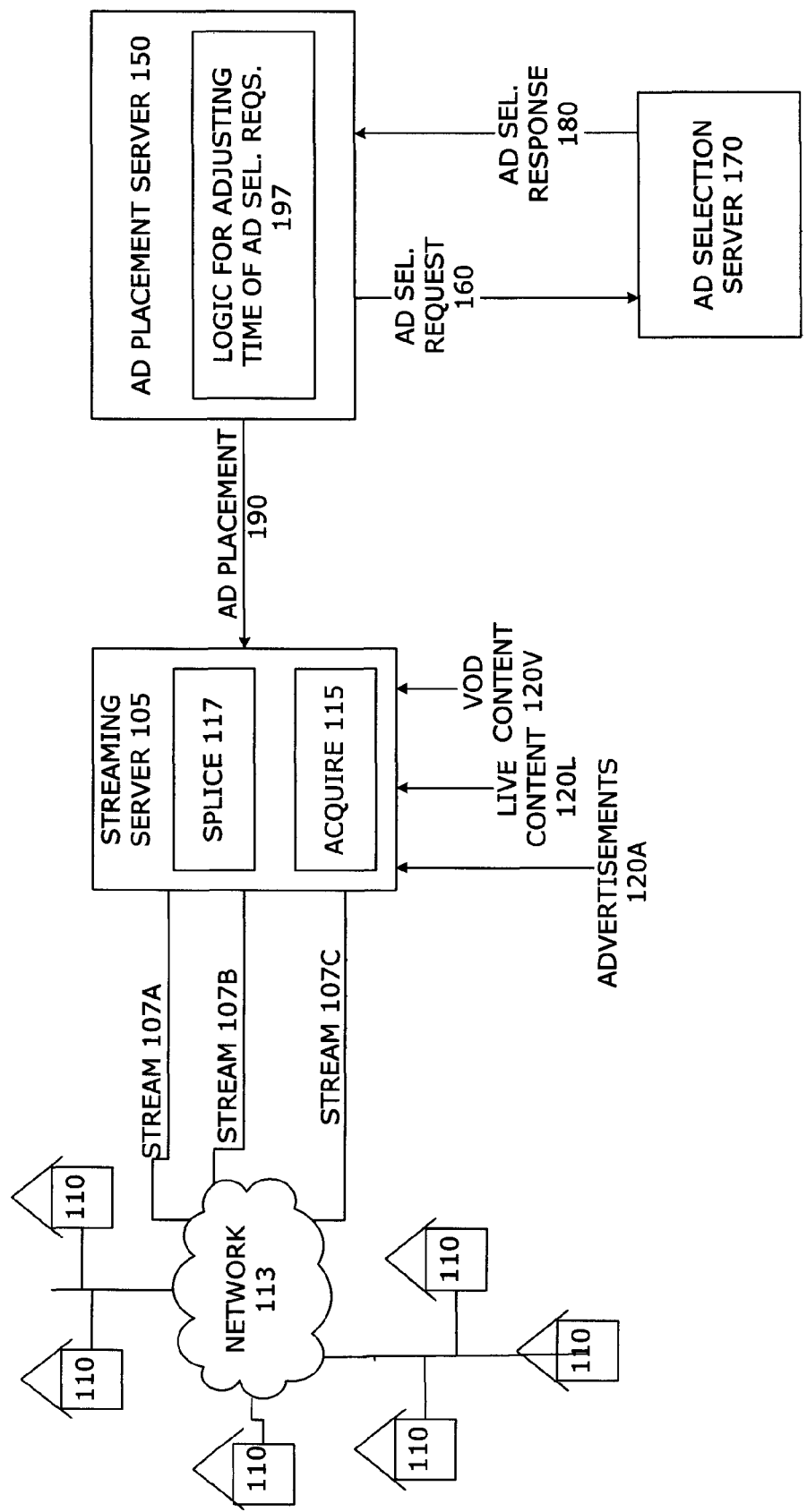
FIG. 1 is a block diagram of an environment in which one embodiment of a system and method for scaling just-in-time placement of advertising content is implemented.

FIG. 1 is a block diagram of an environment in which one embodiment of a system and method for scaling just-in-time placement of advertising content is located. A streaming server 105 ingests content and produces streams 107A-C. Streams 107A-C are supplied to one or more subscribers 110 over a network 113. Typically, each stream 107 is delivered to one subscriber or a relatively small group of subscribers, but the principles described herein apply to a stream 107 delivered to large groups of subscribers also.

Streaming server 105 performs two functions—content acquisition (115) and ad splicing (117)—to produce streams 107A-C. Examples of acquired content include VOD content (120V), live broadcast content (120L), and ads (120A). Thus, a stream 107 includes program content (e.g., a television program, a movie, a sports event, music, etc.) and ads.

Through an interface to streaming server 105, an ad placement server 150 is aware of the existence of active streams (e.g., broadcast, on-demand, etc.), and of current and future (potential) ad placement opportunities in active streams 107. Ad placement server 150 requests (160) an ad selection server 170 to select a particular ad for placement into stream 107 at a detected ad opportunity time. Ad selection server 170 makes decisions as to which advertising action is to be taken for potential ad placement opportunities, and communicates the decision to ad placement server 150. A person of ordinary skill in the art should be familiar with the parameters used by ad selection server 170 to select an appropriate ad. Some example parameters include content or asset identifiers and metadata (e.g., linear program, time-shifted program, or stored video-on-demand asset). Other examples include subscriber parameters (e.g., subscriber identifier, or richer subscriber metadata) and ad opportunity parameters (e.g., book-end ad, embedded ad, ad presented at user pause). As should be appreciated by a person of ordinary skill in the art, these parameters may be provided by different interfaces and/or different sources.

Ad placement server 150 receives a response (180) from ad selection server 170, identifying a particular ad. At a time near the ad opportunity, ad placement server 150 instructs (190) splicer 117 to perform the instructed advertising placement action on stream 107. Placement actions include replacement, insertion, deletion, and others. Generally, insertion and deletion are used in on-demand scenarios rather than live video content.

Although it is desirable for ad selection to occur in close proximity to the ad opportunity time, this behavior can result in missed opportunities if ad selection server 170 takes too long to respond. Ad placement server 150 includes logic for adjusting time of ad selection requests 197 to dynamically adjust timing of requests to ad selection server 170 in a manner which reduces overload of ad selection server 170. Interactions between various components of FIG. 1 will be described in further detail in connection with the data flow diagram of FIG. 2.

As should be appreciated by a person of ordinary skill in the art, the functionality of ad selection server 170, ad placement server 150 and streaming server 105 can be distributed in various ways. The functional components can be arranged as peers, or can be nested in various hierarchies. In the example configuration of FIG. 1, these components are located at the core of the network. However, a person of ordinary skill in the art should also appreciate that these components may be instead located at the edge of the network or somewhere in the middle (e.g., at a distribution hub). A few example configurations will now be described.

In one configuration, ad placement server 150 is integrated with streaming server 105. In another example configuration, ad placement server 150 is a separate component from streaming server 105. In another example configuration, splicer 117 is a separate component from streaming server 105. In yet another configuration, streaming server 105 ingests live (broadcast) programs and initiates splicing, and a separate splicer 117 downstream of the streaming server completes the splice. In yet another configuration, acquirer 115 acquires live broadcast content 120L and ads 120A, and streaming server 105 streams ads 120A to an external splicer 117. Timing of these ads 120A is based on splicer 117 informing streaming server 105 of the pending arrival of ad placement opportunities.

Figure 2:
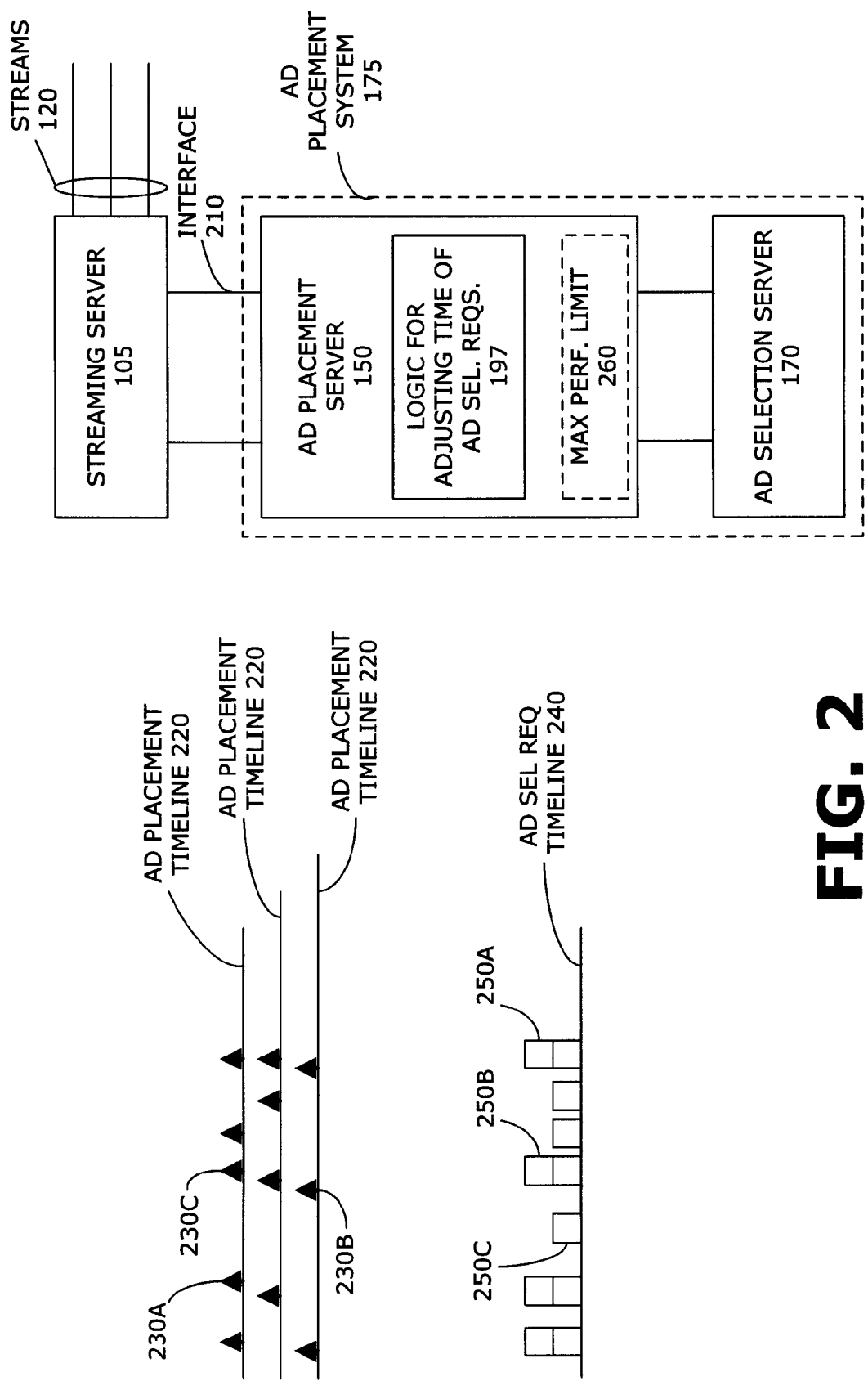
FIG. 2 is a data flow diagram showing example interactions between various components of FIG. 1.

FIG. 2 is a data flow diagram showing interactions between various components of FIG. 1. Ad placement server 150 is aware of active streams 107 (see FIG. 1) that are produced by streaming server 105. More specifically, ad placement server 150 is aware through interface 210 of session creation/termination events and pending ad placement opportunities. Ad opportunities are affected by playout rate: for example, when a viewer goes forward at 64× normal, then the decision on where to place an ad will occur much sooner than previously expected. Therefore, ad placement server 150 is also aware through interface 210 of an expected timeline for playout on streams 107. Based on this information, logic 197 creates a predicted ad placement timeline 220 for a particular stream 107. That is, logic 197 determines a set of ad placement times 230 (e.g., 230A, 230B, etc.) which are likely to occur in the future, at particular points in that stream 107. In embodiments in which ad placement server 150 handles multiple streams 107, multiple ad placement timelines 220 are produced.

Thus, the positioning of each ad placement time 230 on an ad placement timeline 220 results in a corresponding ad selection request (160 in FIG. 1) to ad selection server 170. Furthermore, ad selection server 170 handles ad selection requests for multiple streams 107. Logic 197 builds a predicted ad selection request timeline 240 for ad selection server 170, which includes a predicted ad selection request time 250 (e.g. 250A, 250B, etc.) for each ad placement time 230, for each of streams 107. The resulting ad selection request timeline 240 may include multiple ad selection requests at substantially the same time, as can be seen in FIG. 2 by the positioning of blocks (representing ad selection request times 250) on the ad selection request timeline 240.

Logic 197 is aware of a maximum performance limit 260 associated with ad placement system 175, and chooses the ad selection request times 250 so that the aggregate request load on ad placement system 175, at any one point in time, does not exceed performance limit 260. (In the embodiment of FIG. 2, system 175 includes ad placement server 150 and ad selection server 170.) In other words, in choosing a time 250 for a particular ad selection request, logic 197 considers the cumulative effect of any other ad selection requests occurring at substantially the same time. The result is that the time of selection request for some ads occurs immediately before the time of ad placement, while the time of selection request for other ads occurs earlier in time, so as to avoid overloading of ad placement system 175. For example, in FIG. 2, ad placement time 230B and 230C occur at substantially the same time. Therefore, a conventional "just in time" request (nearest the placement time) results in the corresponding ad selection request times (250B and 250C) also being substantially the same. In contrast, as shown in the example of FIG. 2, logic 197 moves ad selection request time 250C earlier in time—farther away from the placement time—so as to not coincide with ad selection request time 250B.

Once created, the predicted ad placement timeline 220 is then updated. The update may be periodic, or triggered by an event. One such event is interactive user behavior that is detected on a stream 107. Updating ad placement timeline 220 after interactive user behavior is discovered allows ad placement server 150 to take into account time shifts for ad placement opportunities that can occur if a user viewing the stream 107 invokes interactive behavior. For example, a pause or rewind moves the ad opportunity later in time, while a fast-forward moves the ad opportunity earlier in time. Other examples of interactive events include responding to a pop-up survey or a quiz menu. Other triggering events include changes in stream behavior, which are unpredictable but nonetheless discoverable by ad placement server 150. This update of ad placement timeline 220 allows predicted ad placement time 230 to be iteratively refined. Furthermore, since times in the ad selection request timeline 240 are based on times in the ad placement timeline 220, the ad selection request timeline 240 is also updated and refined after initial creation.

Figure 3:
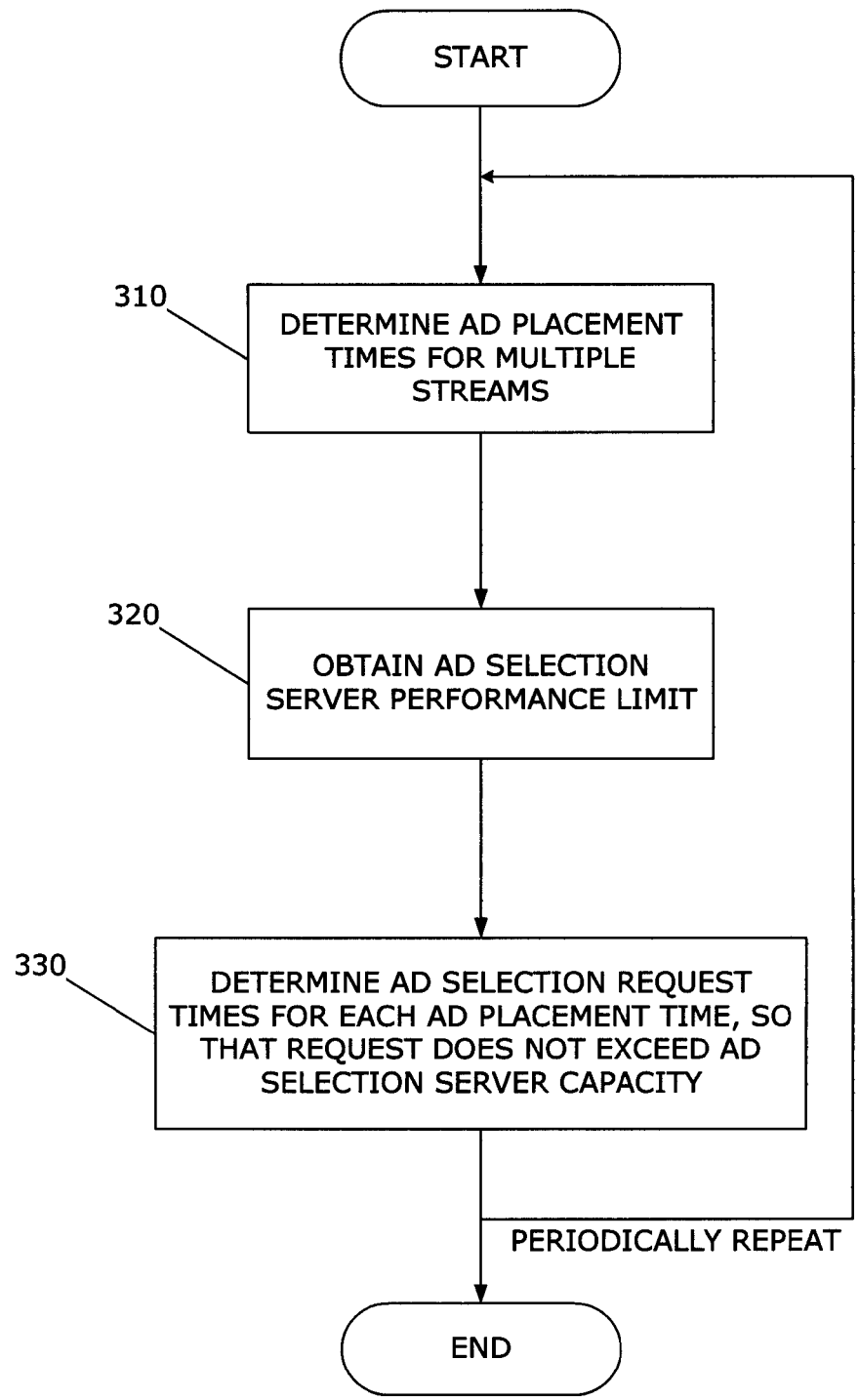
FIG. 3 is a flowchart of one embodiment of logic for adjusting time of ad selection requests of FIGS. 1 and 2.

FIG. 3 is a flowchart of one embodiment of logic for adjusting time of ad selection requests 197 from FIGS. 1 and 2. The process begins at block 310, where logic 197 determines ad placement times 230 across streams which are in use (i.e., open sessions). As described earlier, ad placement times 230 for a particular stream 107 can be viewed collectively as an ad placement timeline 220. Thus, block 310 creates multiple ad placement timelines 220. Processing continues at block 320, where logic 197 obtains a performance limit 260 associated with ad selection server 170.

In some embodiments, this limit is expressed as single parameter describing the request capacity of ad selection server 170 (e.g., transactions per second). This limit may be a fixed value, or a variable limit with a value that depends on one or more factors. These factors include (but are not limited to): placement function (e.g., replace, insert, delete); type of ad selection request (e.g., ad to be inserted in as a bookend, ad to be inserted in response to a user pause); a flag indicating that user interactivity with the ad is supported; amount of subscriber metadata; amount of stream metadata (e.g. genre, title, etc.); amount of advertising metadata (e.g. content is owner placed but the right to do local ad placement happens after a timeline expires).

In other embodiments, performance limit 260 includes multiple parameters that describe the request capacity of ad selection server 170, such as CPU utilization, utilization of storage bandwidth, and/or utilization of network bandwidth. In still other embodiments, performance limit 260 is associated with ad placement server 150 as well as ad selection server 170. That is, the utilization of both servers is taken into account, since requesting ad selections uses resources of both the requester (ad placement server 150) as well as the receiver of the request (ad selection server 170). More specifically, a total system load depends on both predicted load on ad placement server 150 and on responsiveness of ad selection server 170. For example, ad placement server 150 may be performing other tasks at the time an ad selection request is scheduled to be communicated to ad selection server 170, in which case ad placement server 150 may not have enough resources to perform all the tasks including the request. As another example, the amount of data present in the ad placement response (i.e., verbosity) also contributes to the calculation of total system load.

The mechanism by which ad placement server 150 discovers (or is otherwise aware of) performance limit 260 may vary. In one embodiment, performance limit 260 is known a priori by ad placement server 150 (i.e., "hard coded"). In another embodiment, performance limit 260 is obtained via an explicit query of ad selection server 170. In yet another embodiment, ad placement server 150 discovers performance limit 260 by monitoring the behavior of ad selection server 170, and then profiling the behavior.

Processing continues at block 330, where logic 197 determines ad selection request times 250 corresponding to the ad placement times 230, such that the total number of selection requests (requests 160 in FIG. 1) made within a particular duration does not exceed the capacity of ad placement system 175. When ad placement opportunities from different streams 107 occur at substantially the same time, logic 197 may create multiple ad selection request times 250 with substantially the same time value. In this manner, ad placement server 150 is directed to make multiple ad selection requests 160 at substantially the same time. However, when choosing a time value for a particular ad selection request 160, block 330 takes into account the capacity of ad selection server 170 for fulfilling requests. If other ad selection requests 160 are already assigned this same time value, and assigning the ad selection request 160 that is under consideration to this same time value also exceeds the capacity of ad selection server 170, then block 330 assigns a different time value to the ad selection request 160 under consideration, such that the selection request is fulfilled before the corresponding ad placement time 230.

Some embodiments of logic 197 avoid overload of ad placement system 175 by moving ad selection requests other than the one under consideration along ad selection request timeline 240. The decision as to whether or not a particular ad selection request 160 is moved along ad selection request timeline 240 may be based on priorities of various properties such as stream popularity, subscriber importance, and staleness of the ad. For example, one criteria for whether or not to move an ad selection request is the popularity of an ad. Suppose a particular ad selection request was scheduled relatively far in the future, and the program content is popular, but viewing of that ad is unpopular. In that case, then other viewers that are playing the same content and are receiving that same ad can be rescheduled for another ad selection request, allowing another ad to be selected for those viewers.

Some embodiments of logic 197 (in ad placement server 150) avoid overload of ad placement system 175 by making one ad selection request 160 for multiple streams. For example, if a particular program is viewed by N viewers, and if the load is high, then logic 197 can reduce the load by making a single request 160 for those N streams. Some embodiments of logic 197 (in ad placement server 150) avoid overload of ad placement system 175 by deciding not to send a particular ad selection request 160 to ad selection server 170, which may also be viewed as abandoning a request. Particular embodiments of logic 197 may support more than one of the move and abandon behaviors described above.

Because some types of ad placement events, such as trick mode pause, are difficult to predict with accuracy, the conventional approach to is to handle such events by requesting an ad selection immediately (i.e., "insert now"). However, when multiple users go into trick mode at substantially the same time, this can cause the projected load on the ad selection server to increase beyond its limits. In a conventional system, the ad selection server handles this overload by choosing to ignore some of the ad selection requests. Some embodiments of logic 197 respond in a different way when an unpredictable ad placement event occurs: if the current request load is already at performance limit 260, then logic 197 selects an ad and performs an ad placement without reference to ad selection server 170.

This selection is based on criteria such as the earlier decision history of ad placement server 150, or on configurable rules. The rules may be static, or may be dynamically updated to reflect viewing behavior (i.e. another rule is obtained from the ad selection server). Making the ad selection decision in ad placement server 150 rather than in ad selection server 170 means the decision is made closer in time to the actual ad placement event. This is advantageous because if the request load on ad selection server 170 decreases, then logic 197 can reconsider and make an ad selection request after all.

One scenario illustrating the desirability of choosing an ad selection request time based on the earlier decision history of ad placement server 150 is as follows. Suppose a viewer rewinds to a point before the ad, and then play the ad at normal speed (1×). Ad placement server 150 can determine whether or not the user has previously played the ad at normal speed. If not, ad placement server 150 makes a new ad selection request, allowing a different ad to be selected and inserted, and ad selection is more optimal since the time of selection is very close to the time of viewing. On the other hand, if the viewer already played the ad at normal speed, ad placement server 150 does not request an ad selection, and whichever ad was previously inserted is seen by the viewer. Thus, an ad selection decision is made when the subscriber replays an ad: an example of making decisions based on previous decisions. In another variation, ad placement server 150 does not make a new ad decision unless significant time had elapsed since the last time the user traversed the ad.

The determination of which selection requests are to be moved along ad selection request timeline 240 was discussed above, as well as whether some requests are abandoned. Logic 197 also determines where a request is to be moved (i.e., what time the ad selection request 160 occurs), such that overload of ad placement system 175 is avoided. In some embodiments, logic 197 attempts to move the selection request to a point in time along ad selection request timeline 240 that is as near to the ad placement time 230 as possible. For some embodiments, then, the result is that the time of selection request for some ads occurs immediately before the time of ad placement, while the time of selection request for other ads occurs earlier in time, so as to avoid overloading ad selection server 170 with requests. Furthermore, as the load on ad selection server 170 increases, the time of ad selection requests is moved to points in time that are increasingly earlier than the ad placement event, thus insuring that ad selection requests are fulfilled before the ad placement event occurs.

In some embodiments, logic 197 attempts to use a default choice for an ad selection request time 250, but uses an earlier time instead if that default choice results in the aggregate request load exceeding the maximum. In one such embodiment, the default choice for an ad selection request time 250 is in close proximity to, and before, the corresponding ad placement time 230. That is, if the placement time for a particular ad/stream is X, then the default time for the selection request for that same ad/stream is X−Δ, where Δ is related to the expected response time for the request (e.g., 4 seconds).

After block 330, processing may wait for an event to occur, such as creation of a new stream or a timeout, and then processing repeats starting with block 310. In this manner, multiple iterations of calculations refine the predicted ad selection request times 250, taking into account changes in playout behavior for streams 107. The result is a smooth and dynamic adjustment to the signaling load between ad placement server 150 and ad selection server 170.

Figure 4A:
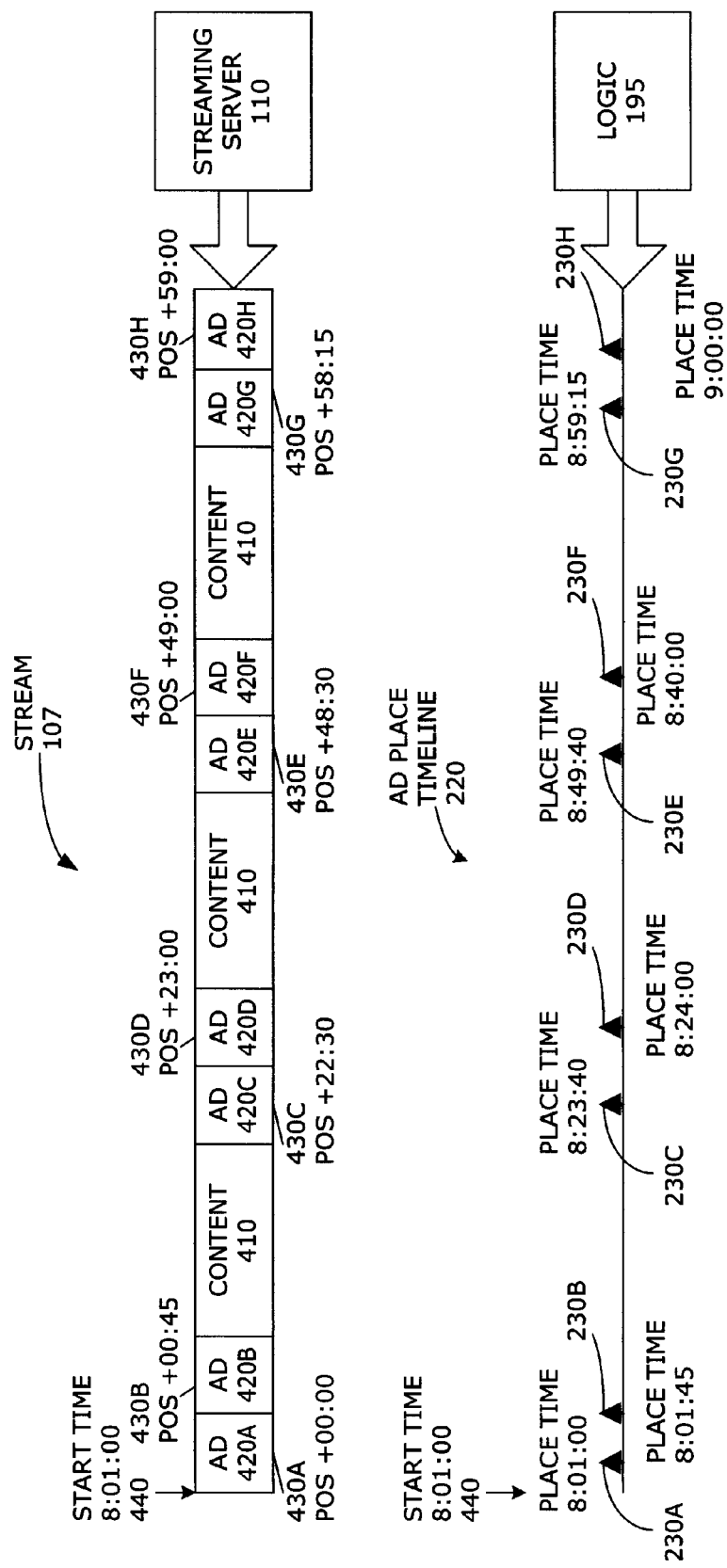
FIGS. 4A and 4B are block diagrams illustrating creation of the predicted ad placement timeline of FIG. 3, in one example scenario.

The creation of predicted ad placement timeline 220 (block 310) is now discussed in connection with the block diagram of FIGS. 4A and 4B. As shown in FIG. 4A, streaming server 105 produces stream 107, which in this example represents a one-hour program including three content blocks 410 interspersed among eight ad opportunities 420A-G. Ad opportunities 420A, B, G, and H are commonly known as bookend ads, since they are placed at the start and end of the program, respectively. Ad opportunities 420C-F are commonly known as embedded ads, since they are embedded within the program. Each ad opportunity 420 occurs at a specific position 430 within the program stream, relative to the start of the program: ad opportunity 420A occurs at stream position 00:00 and is 45 seconds long; ad opportunity 420B occurs at stream position 00:45 and is 45 seconds long; ad opportunity 420C occurs at stream position 22:30 and is 30 seconds long; ad opportunity 420D occurs at stream position 23:00 and is 30 seconds long; ad opportunity 420E occurs at stream position 38:30 and is 30 seconds long; ad opportunity 420F occurs at stream position 49:00 and is 30 seconds long; ad opportunity 420G occurs at stream position 58:15 and is 45 seconds long; and ad opportunity 420H occurs at stream position 59:00 and is 45 seconds long.

In this example, stream 107 represents a video-on-demand (VOD) or near-video-on-demand (nVOD) program. When a subscriber 110 (or group of subscribers) requests the VOD program, streaming server 105 preprocesses encoded video programming (blocks 410) and ad opportunities (blocks 420A-H), and so is aware of the stream structure. Streaming server 105 generates output based on this stream structure, and also makes ad placement server 150 aware of the structure. Logic 197 then has access to the structure of the entire stream 107 before transmission.

Streaming server 105 determines a start time 440 for the stream 107, and communicates this to logic 197. For example, an nVOD program may have a start time 440 at the next 5 or 10 minute mark (e.g., if subscriber requests the program at 8:12, the program starts at 8:15), while a VOD program may have a start time 440 that is sooner (e.g., as soon as the provider's resources can be allocated, the stream created, etc.)

Once start time 440 is established, logic 197 creates ad placement timeline 220 as follows. Each ad opportunity 420 has an associated stream position 430, relative to the start of the program stream 107. For each ad opportunity 420, logic 197 uses this stream position 430 to calculate an ad placement time 230 relative to the program start time 440, and inserts this ad placement time 230 onto ad placement timeline 220. In FIG. 4A, start time 440 is 8:01 and the first ad opportunity 420A occurs at stream position 430A, which is at relative stream position 00:00 or coincident with the start. Therefore, a corresponding ad placement time 230A is inserted onto ad placement timeline 220 at 8:01:00. Similarly, the second ad opportunity 420B occurs at stream position 430B, which is at relative stream position 00:45, so a corresponding ad placement time 230B is inserted onto ad placement timeline 220 at 8:01:45. A person of ordinary skill in the art should appreciate that points within stream 107 are not absolute in time, but are only relative to the start of the stream, while points within ad placement timeline 220 are, in contrast, absolute in time and anchored by a particular value for start time 440. That is, points in the original content timeline are relative to the start of the stream, while points in the playout timeline are absolute.

Figure 4B:
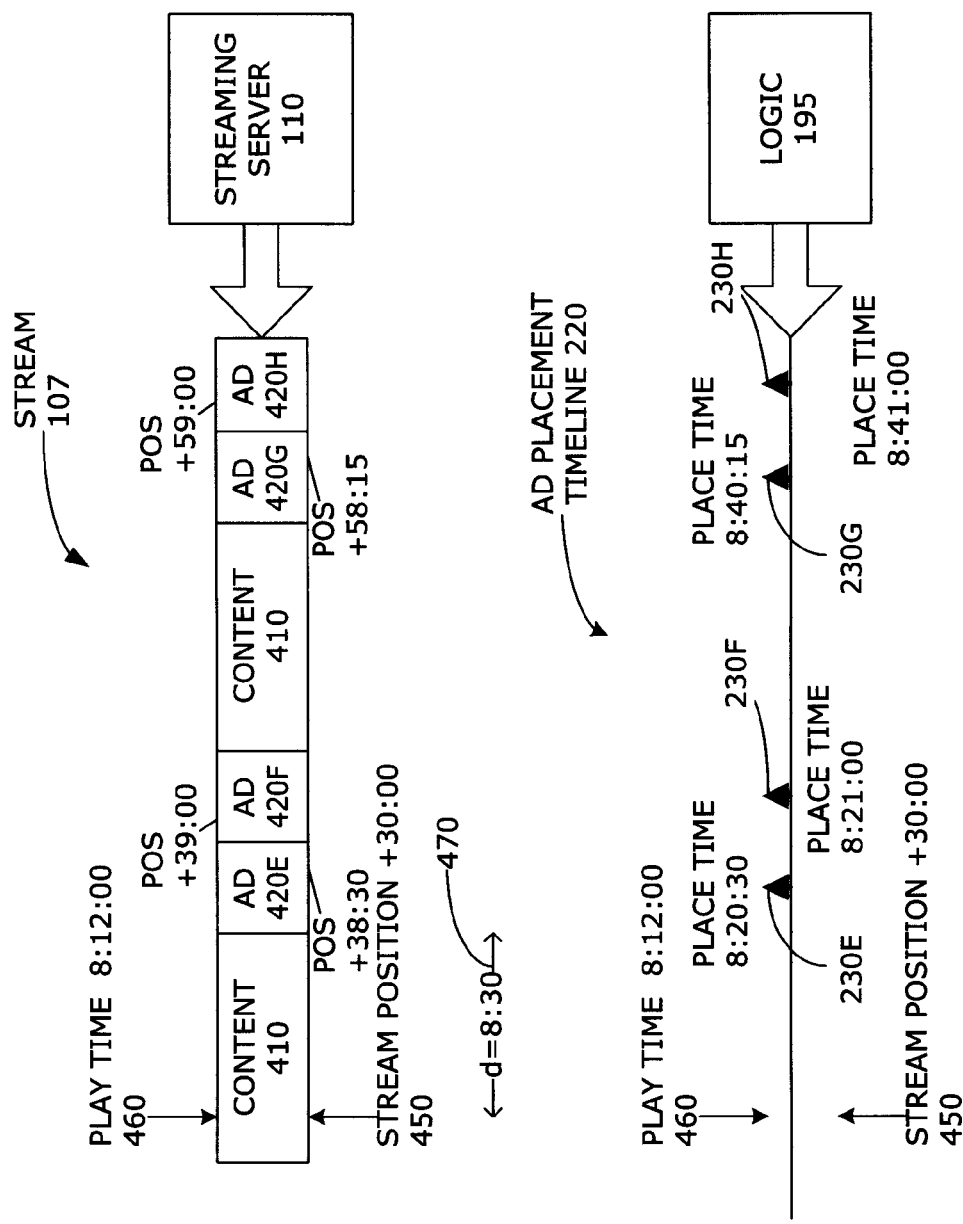

FIG. 4B is a block diagram similar to FIG. 4A, but illustrating how logic 197 updates ad placement timeline 220 after the stream start time 440, in order to reflect user playout behavior. At the time shown in FIG. 4B, the current playout stream position 450 is 00:30—thirty minutes of programming has been played out. However, the play time 460 is 8:12—only eleven minutes have elapsed since stream 107 began playing at 8:01. This shows that the user has invoked some sort of trick mode behavior, by fast-forwarding or skipping ahead, and the stream rate has returned to normal (1×) playout. (Thus "played out" does not actually imply that the user has viewed programming blocks from 00:00 to 29:59—only that the current playout position 450 is ahead of those blocks.) Logic 197 updates those ad placement times 230 which are still in the future, based on the current play time 460 and current playout position 450. Logic 197 calculates the difference 470 between the current playout position 450 and the stream position of the first ad opportunity 420E, which in this example is 38:30-30:00, or 8:30. Logic 197 then adds this difference 470, which is 8:30 in this example, to the new play time 460 of 8:12 to produce the new ad placement time 230E of 8:20:30. The remaining ad placement times 230F-H are calculated in a similar manner to be 8:21:00, 8:40:15, and 8:41:00.

A person of ordinary skill in the art should understand ad placement timeline 220 to be an abstraction useful to understand ad placement times, and should understand that logic 197 is not required to maintain a specific timeline data structure. For example, logic 197 can instead maintain ad placement times 230 as separate data structures which are not part of a collection. However, a person of ordinary skill in the art should understand the ad placement time data structures, when viewed as a collection, to be an "ad placement timeline".

In the embodiment described in connection with FIGS. 4A and 4B, the ad placement timeline 220 that is initially created by logic 197 assumes a 1× playout of the stream 107, and the ad placement timeline 220 is adjusted periodically to take into account actual playout behavior. Other embodiments use different assumptions about stream playout when initially creating ad placement timeline 220, for example, taking into account past history of an individual subscriber, other subscribers, stream content, and variations according to time of day.

The creation of ad selection request timeline 240 (block 330) is now discussed in connection with the block diagrams of FIG. 5A-D. FIGS. 5A-D illustrate an example sequence in which ad selection request times 250 are added to ad selection request timeline 240 based on ad placement timelines 220, stream by stream. The scenario begins with FIG. 5A, in which logic 197 processes ad placement timeline 220-1, associated with a first stream 107 (not shown), to produce ad selection request timeline 240. Ad placement timeline 220-1 includes three different ad placement times: 230-1A, 230-1B, and 230-1C. For each of ad placement times 230-1A, 230-1B, and 230-1C, logic 197 adds a corresponding ad selection request time 250-1A, 250-1B, and 250-1C. After processing ad placement timeline 220-1, ad selection request timeline 240 contains three different ad selection request times, 250-1A, 250-1B, and 250-1C, at times 510, 520, and 530 (respectively).

In FIG. 5A, each ad placement time 230-A roughly lines up on the time (vertical) axis with a corresponding ad selection request time 250-1A. This illustration was chosen to highlight the correspondence between an ad placement time 230 and an ad selection request time 250. However, because a selection request 160 does take a finite amount of time to execute, in some embodiments the ad selection request time 250 will actually be placed before (earlier than) the corresponding ad placement times 230, so that the selection request 160 has time to complete before the ad placement time arrives. Thus, some embodiments will place an ad selection request time 250 a fixed amount of time before the corresponding ad placement times 230, while other embodiments may use a variable offset for the ad selection request time 250, for example if selection requests 160 vary according to some pattern.

Figure 5B:
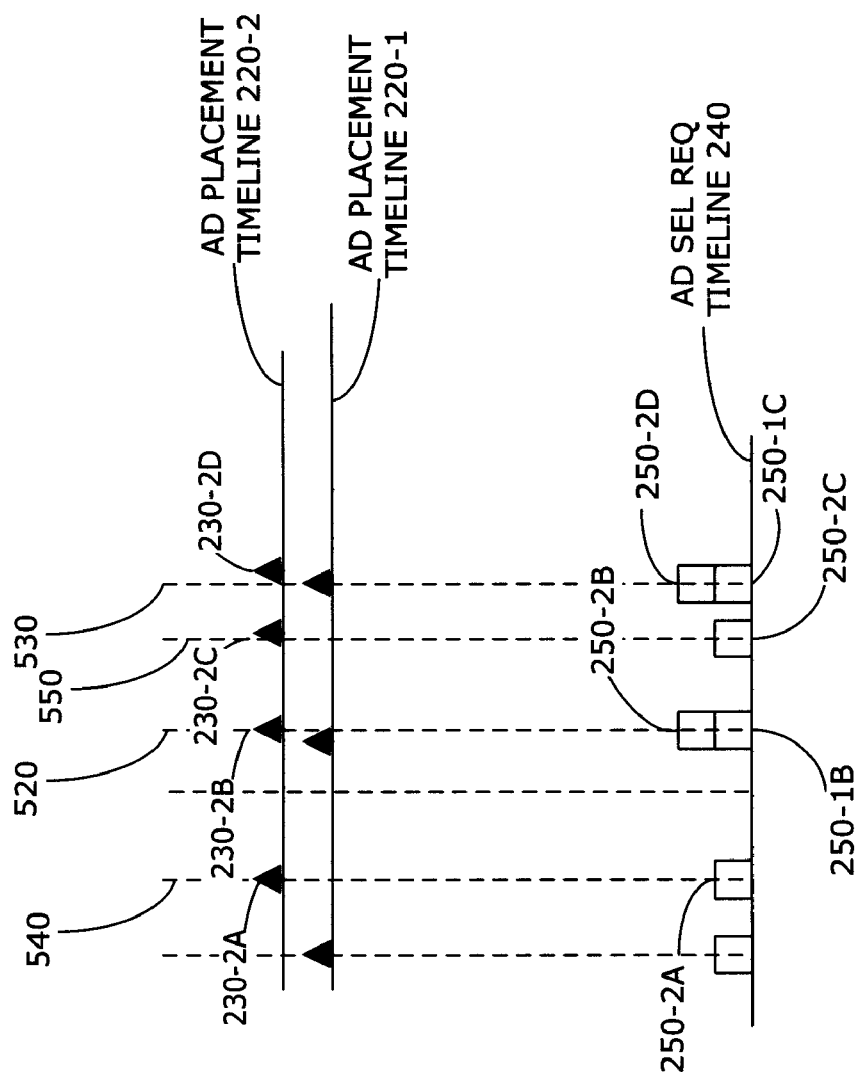

In FIG. 5B, logic 197 processes ad placement timeline 220-2, associated with a second stream 107 (not shown), and updates ad selection request timeline 240 accordingly. Ad placement timeline 220-2 includes four different ad placement times: 230-2A, 230-2B, 230-2C, and 230-2D. In adding ad selection requests for these ad placement times to ad selection request timeline 240, logic 197 checks to insure that doing so will not overload ad selection server 170, by comparing the result of the possible addition to performance limit 260. In this example, ad placement time 230-2A occurs at time 540, and no other ad selection requests are present at time 540. Therefore, logic 197 proceeds with adding ad selection request time 250-2A to time 540.

Logic 197 continues processing of ad placement timeline 220-2 by considering placement of a request for ad placement time 230-2B, which occurs at time 520. Logic 197 determines that another ad selection request (250-1B) is already present at time 520. Logic 197 also determines that adding the second ad selection request (250-2B) to time 520 will not overload ad selection server 170, by comparing the result of the possible addition to performance limit 260. In this example, performance limit 260 is a fixed value of 2. Therefore, logic 197 chooses to place ad selection request 250-2B at time 520, since that placement results in two substantially simultaneous request transactions for ad selection server 170 and meets but not exceed performance limit 260.

Logic 197 continues processing of ad placement timeline 220-2 by considering placement of a request for ad placement time 230-2C, which occurs at time 550. Logic 197 determines that no other ad selection requests are present at time 550. Therefore, logic 197 proceeds with adding ad selection request time 250-2C to time 550.

Processing finishes with ad placement time 230-2D in a similar manner. Before adding a corresponding request for ad placement time 230-2D, which occurs at time 530, logic 197 determines that another ad selection request (250-1C) is already present at time 530. However, after comparing performance limit 260 with the result of the possible addition, logic 197 nonetheless chooses to place ad selection request 250-2D at time 520, since doing so will result in only two substantially simultaneous request transactions for ad selection server 170. After processing ad placement timelines 220-1 and 220-2, ad selection request timeline 240 contains seven different ad selection request times, and two of these times (520 and 530) meet but do not exceed performance limit 260.

Figure 5C:
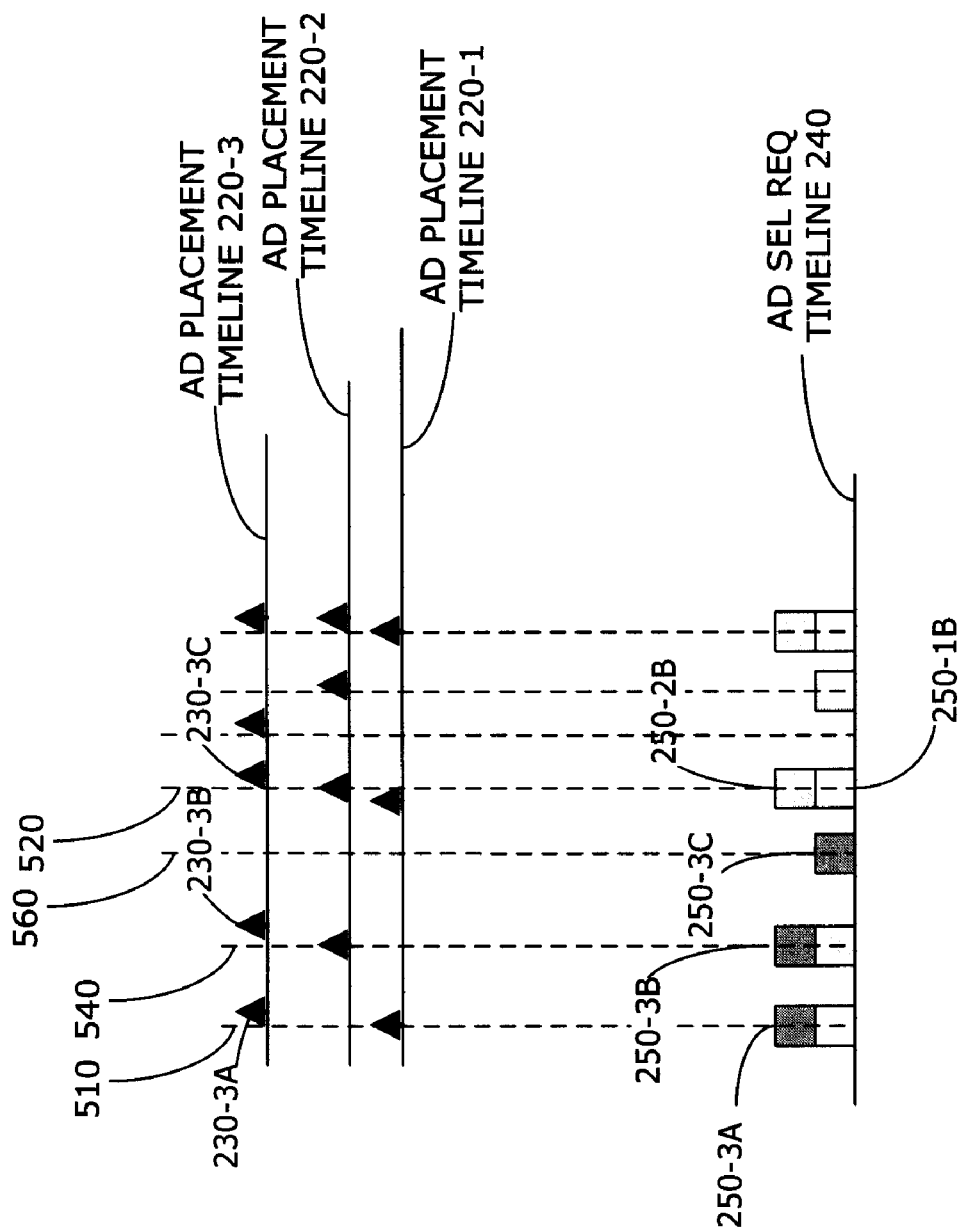

In FIG. 5C, logic 197 processes ad placement timeline 220-3, associated with a third stream 107 (not shown), and updates ad selection request timeline 240 accordingly. The first two ad placement times that are processed (230-3A and 230-3B), occur at times 510 and 540, respectively. In each case, another selection request has already been placed at that time. However, after comparing performance limit 260 with the result of the possible addition, logic 197 nonetheless chooses to place ad selection request 250-3A at time 510, and 250-3B at time 540, since doing so will result in only two substantially simultaneous request transactions for ad selection server 170. Next, ad placement time 230-3C is processed. Ad placement time 230-3C occurs at time 520, which already has two other ad selection requests (250-1B and 250-2B). Since adding a third request to time 520 will exceed the performance limit 260 of 2, logic 197 places ad selection request 250-3C at another point in time (560), which is earlier than time 520.

Figure 5D:
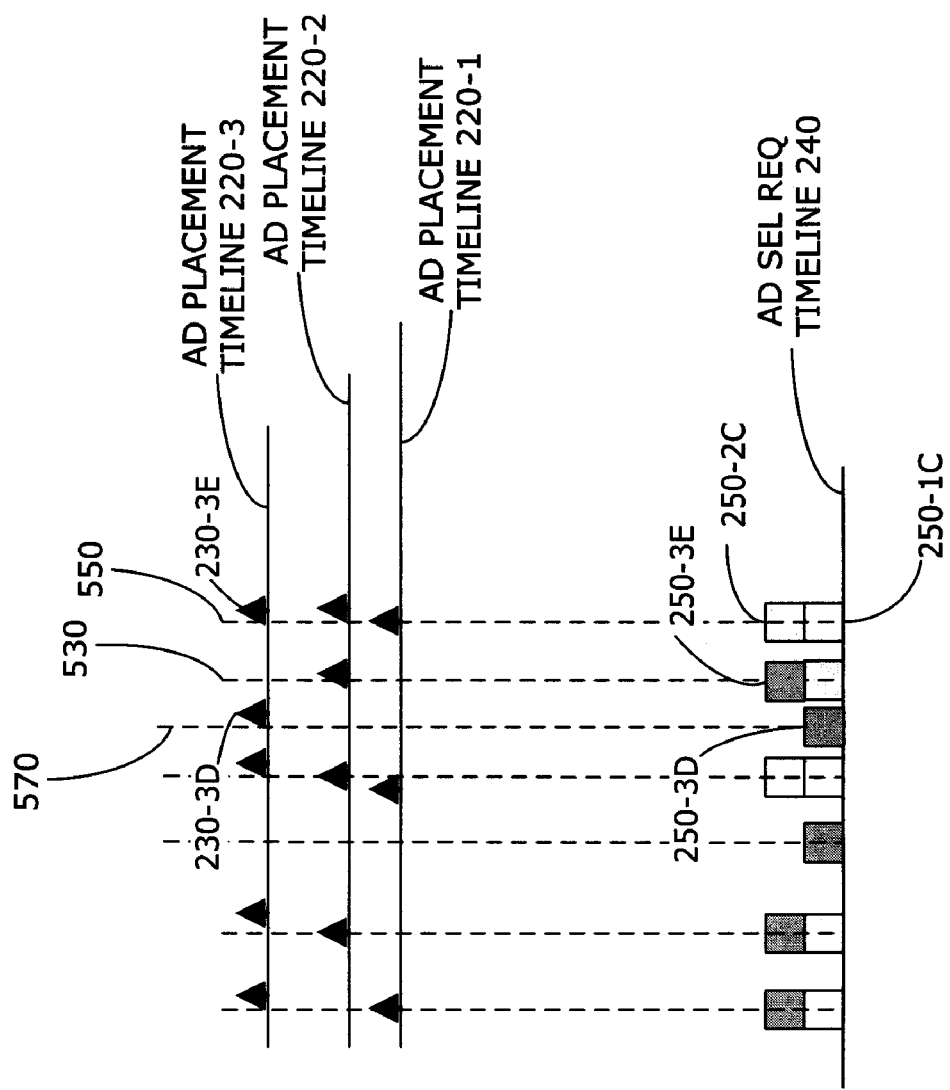

FIG. 5D illustrates processing of the remaining two ad placement times, 230-3D and 230-3E. Ad placement time 230-3D occurs at time 570, and no other selection requests are present at time 570, so logic 197 proceeds with adding ad selection request time 250-3D to time 570. Logic 197 determines that ad placement time 230-3E occurs at time 550, which already contains two other ad selection requests (250-1C and 250-2C). Since adding a third request to time 550 will exceed the performance limit 260—which in this example is 2—logic 197 places ad selection request 250-3E at another point in time (530), which is earlier than time 550. Before placing ad selection request 250-3E at time 530, logic 197 first determines the number of selection requests already present at time 530. Here, there is only one request already present at time 530, so adding a second will meet but not exceed the performance limit 260.

In the embodiments described above, performance limit 260 is fixed for all types of selection requests, or may vary based on the type of selection request. In other embodiments, performance limit 260 is not an absolute maximum, but is instead set to a value which allows some degree of headroom—that is, even when the number of signaling requests in a given time period is at the performance limit 260, ad selection server 170 is not operating at maximum capacity. This variation is useful since the timing of some ad placement events is not known with certainty (e.g., user request to play new content, trick mode request, user request for interactive advertising leading to a decision to invoke a long-form ad). In such embodiments, the size of the performance limit 260 may be a configured threshold (e.g., 80% of true maximum) or can be dynamic based upon system history (content, subscriber, and/or time of day).

Some embodiments monitor not only the load on the ad selection server, but also the load on other system and network resources. For example, if the CPU load in the streaming server 105 or ad placement server 150 has reached a certain threshold, then the timing of ad selection requests 160 can be adjusted so as to avoid peaks in CPU load. Alternatively, a rules-based approach can be used to fulfill certain decisions. Other examples of resources include on-server I/O bandwidth and control plane network I/O.

In the embodiments described above, when an attempt to place an ad selection request results in an overload on ad selection server 170, it is the newest ad selection request—the one currently under consideration, that logic 197 moves to another (earlier) point in time. In other embodiments, another ad selection request—one already assigned to a particular time—is instead moved to an earlier point in time. Such embodiments prioritize ad selection requests, with the highest priority requests being assigned the time closest to the ad placement time (closest to "just in time"), and lower priority requests being assigned times further ahead of (earlier than) the ad placement time, so as to spread the ad selection signaling load over time.

One such embodiment gives highest priority to real-time events such as a start play (e.g. play movie) or trick mode play (e.g., pause). Next in priority are ad placement events which have relatively short decision windows, such as an SCTE35 "available" event within a linear broadcast feed). Lowest priority is given to ad placement events with relatively long decision windows, such as an embedded ad in a pre-ingested piece of content. A person of ordinary skill in the art should be familiar with the difference between content that is pre-ingested (i.e., not in real-time), such as video on demand, and content that is ingested in real-time such as linear broadcast TV.

Another embodiment assigns priorities based on content popularity, with the highest priority going to the most popular content. Yet another embodiment assigns priorities based on subscriber identity, so that subscribers or groups of subscribers are given graduated levels of priority.

The interval associated with each time may vary in different embodiments. For example, one embodiment may group selection requests together—placing the requests at the same time—when ad insertion times are 2 seconds apart. Another embodiment may require ad insertion times to be only 500 ms apart before group selection requests together.

FIG. 6 is a block diagram showing selected components of one embodiment of ad placement server 150. Ad placement server 150 comprises: a network interface 610; a processor 620; and memory 630. These components are coupled by a bus 640. Memory 630 contains instructions that are executed by processor 620 to control operations of ad placement server 150, including logic 197. Ad placement server 150 communicates with other components, such as ad selection server 170 and streaming server 105, through network interface 610. Omitted from FIG. 6 are a number of conventional components, known to those skilled in the art, that are unnecessary to explain the operation of the systems and methods of scaling just-in-time placement of advertising content disclosed herein.

A person of ordinary skill in the art should understand that software components referred to herein include executable code that is packaged, for example, as a standalone executable file, a library, a shared library, a loadable module, a driver, or an assembly, as well as interpreted code that is packaged, for example, as a class.

Any process descriptions or blocks in flowcharts should be understood as representing modules, segments, or portions of code which include one or more executable instructions for implementing specific logical functions or steps in the process. As should be understood by those of ordinary skill in the art of the software development, alternate embodiments are also included within the scope of the disclosure. In these alternate embodiments, functions may be executed out of order from that shown or explained, including substantially concurrently or in reverse order, depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) a compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. However, the disclosed embodiments were chosen and described to illustrate the principles of the disclosure and its practical application to thereby enable a person of ordinary skill in the art to utilize the disclosure in various embodiments and with various modifications as are suited to the particular use contemplated. All such modifications and variation are within the scope of the disclosure as determined by the appended claims when interpreted in accordance with the breadth to which they are fairly and legally entitled.

What is claimed is:

1. A method comprising:
    determining with a computer a plurality of ad placement times for each of a plurality of associated streams;
    determining with a computer an ad selection request time for each of a plurality of ad selection requests, based on a cumulative effect of any other ad selection requests occurring at substantially the same time as the determined ad selection request time, each of the plurality of ad selection requests corresponding to one of the plurality of ad placement times, wherein the cumulative effect includes determining a how many of the any other ad selection requests are occurring at substantially the same time as the determined at selection request time; and
    presenting ads on a display based on the plurality of ad placement times.

2. The method of claim 1, further comprising:
    updating the plurality of ad placement times; and
    updating the ad selection request time for each of the plurality of ad selection requests.

3. The method of claim 1, further comprising:
periodically updating the plurality of ad placement times; and
periodically updating the ad selection request time for each of the plurality of ad selection requests.

4. The method of claim 1, further comprising:
updating one of the plurality of ad placement times when a user interactivity event is discovered on the associated stream; and
updating the ad selection request time for each of the plurality of ad selection requests, responsive to the updating one of the plurality of ad placement times.

5. The method for claim 1, further comprising:
updating one of the plurality of ad placement times upon a determination that an expected linear ad placement event was not received as expected; and
updating the ad selection request time for each of the plurality of ad selection requests, responsive to the updating one of the plurality of ad placement times.

6. The method of claim 1, further comprising:
determining a first time for a first one of the plurality of ad selection requests;
if the determined number approaches a maximum ad signaling capacity, determining whether requesting an ad selection at the first time will exceed the maximum ad signaling capacity; and
if requesting the ad selection at the first time will exceed the maximum ad signaling capacity, assigning a second time, which occurs before the first time, to the first one of the ad selection requests.

7. The method of claim 1, further comprising:
determining a first time for a first one of the plurality of ad selection requests;
if the determined number approaches a maximum ad signaling capacity, determining whether requesting an ad selection at the first time will exceed the maximum ad signaling capacity;
if requesting the ad selection at the first time will exceed the maximum ad signaling capacity, selecting one of the any other ad selection requests occurring at substantially the same time and assigning a second time, occurring before the first time, to the selected one of the plurality of ad selection requests.

8. A system comprising:
memory with logic; and
a processor configured with the logic to enable the system to:
determine a plurality of ad placement times for each of a plurality of associated streams;
determine an ad selection request time for each of a plurality of ad selection requests, based on a cumulative effect of any other ad selection requests occurring at substantially the same time as the determined ad selection request time, each of the plurality of ad selection requests corresponding to one of the plurality of ad placement times, wherein the cumulative effect includes determining how many of the any other ad selection requests are occurring at substantially the same time as the determined ad selection request time.

9. The system of claim 8, where the processor is further configured to:
update one of the plurality of ad placement times when a trick mode event is discovered on the associated stream; and
update the ad selection request time for each of the plurality of ad selection requests, responsive to the updating one of the plurality of ad placement times.

10. The system of claim 8, where the processor is further configured to:
update one of the plurality of ad placement times when a stream is destroyed; and
update the ad selection request time for each of the plurality of ad selection requests, responsive to the updating one of the plurality of ad placement times.

11. The system of claim 8, where the processor is further configured to:
update one of the plurality of ad placement times when a stream is created; and
update the ad selection request time for each of the plurality of ad selection requests, responsive to the updating one of the plurality of ad placement times.

12. The system of claim 8, where the processor is further configured to:
update one of the plurality of ad placement times upon a determination that an expected linear ad placement event was not received as expected; and
update the ad selection request time for each of the plurality of ad selection requests, responsive to the updating one of the plurality of ad placement times.

13. The system of claim 12, where the processor is further configured to:
upon receiving an unpredictable ad placement event, determine whether a current request load is already at a performance limit;
select an ad, without issuing an ad selection request, by making a rule-based placement decision if the current request load is already at the performance limit.

14. The system of claim 12, where the processor is further configured to:
reissue an ad decision request if a popularity threshold is crossed.

15. A system comprising:
means for determining a plurality of ad placement times for each of a plurality of associated streams; and
means for determining an ad selection request time for each of a plurality of ad selection requests, based on a cumulative effect of any other ad selection requests occurring at substantially the same time as the determined ad selection request time, each ad selection request corresponding to one of the ad placement times, wherein the cumulative effect includes determining how many of the any other ad selection requests are occurring at substantially the same time as the determined ad selection request time.

16. The system of claim 15, further comprising:
means for determining a first time for a first one of the plurality of ad selection requests;
means for determining whether requesting an ad selection at the first time will exceed a maximum ad signaling capacity, if the determined number approaches a performance limit for a parameter associated with ad signaling; and
means for assigning a second time, occurring before the first time, to the first one of the plurality of ad selection requests, if requesting the ad selection at the first time will exceed the performance limit.

17. The system of claim 16, wherein the parameter comprises network signaling load.

18. The system of claim 16, wherein the parameter comprises processor load.

19. The system of claim 15, further comprising:
means for updating the plurality of ad placement times; and
means for updating the ad selection request time for each of the plurality of ad selection requests.

20. The system of claim 15, further comprising:
means for periodically updating the plurality of ad placement times; and
means for periodically updating the ad selection request time for each of the plurality of ad selection requests.

* * * * *